(12) United States Patent
Gibbons et al.

(10) Patent No.: US 6,801,775 B1
(45) Date of Patent: Oct. 5, 2004

(54) ESTABLISHING A COMMUNICATION CHANNEL IN A WIRELESS NETWORK

(75) Inventors: David B. Gibbons, Redmond, WA (US); Eamonn Gormley, Seattle, WA (US); Liang A. Hong, Redmond, WA (US); Elliott Hoole, Redmond, WA (US); Kamyar Moinzadeh, Renton, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 253 days.

(21) Appl. No.: 09/597,043
(22) Filed: Jun. 20, 2000

Related U.S. Application Data

(60) Provisional application No. 60/140,959, filed on Jun. 23, 1999.

(51) Int. Cl.[7] .................................................. H04Q 7/20
(52) U.S. Cl. ...................... 455/450; 455/454; 455/426.1
(58) Field of Search ............................... 455/450, 451, 455/452.1, 452.2, 453, 454, 555, 426.1, 436, 462, 464; 370/328, 329

(56) References Cited

U.S. PATENT DOCUMENTS

| | | | |
|---|---|---|---|
| 5,471,469 A | 11/1995 | Flammer, III et al. ..... 370/94.1 |
| 5,550,355 A | 8/1996 | Jung et al. ................... 219/709 |
| 5,572,546 A | 11/1996 | Serfaty et al. ............... 375/221 |
| 5,574,728 A | 11/1996 | Mamaghani et al. ...... 370/95.1 |
| 5,625,877 A * | 4/1997 | Dunn et al. .................. 455/454 |
| 5,633,873 A * | 5/1997 | Kay et al. .................... 370/336 |
| 5,636,223 A | 6/1997 | Reardon et al. ............. 370/431 |
| 5,729,542 A | 3/1998 | Dupont et al. ............... 370/346 |
| 5,790,551 A | 8/1998 | Chan et al. .................. 370/458 |
| 6,131,012 A * | 10/2000 | Struhsaker et al. ........ 455/3.05 |
| 6,259,905 B1 * | 7/2001 | Berkowitz et al. .......... 455/401 |

* cited by examiner

*Primary Examiner*—Erika Gary

(57) ABSTRACT

A method of operating a communication system is disclosed. The method includes transmitting from a remote unit to a base station remote unit channel data. The remote unit channel is generated at the remote unit and includes data about a first portion of communication channels on which the call can be executed. The method also includes applying a channel selection method to the remote unit channel data and to base station channel data so as to select a communication channel from among the first portion of communication channels. The base station channel data is generated at the base station and includes data about a second portion of the communication channels. The method further includes executing a call on the selected communication channel.

18 Claims, 7 Drawing Sheets

ESTABLISHING A COMMUNICATION CHANNEL IN A WIRELESS NETWORK

RELATED APPLICATIONS

This application claims the benefit of U.S. Provisional Application No. 60/140,959 filed Jun. 23, 1999 and entitled "Method for Establishing a Communication Channel in a Personal Wireless Network," which is incorporated herein in its entirety.

The following applications, assigned to the Assignee of the current invention, and being filed concurrently, contain material related to the subject matter of this application, and are incorporated herein by reference:

Docket No. 1999-0341 (STG167) by D. Gibbons et al., entitled "Methods and Apparatus for Dynamically Assigning Time Slots in a Wireless Communication System," U.S. Ser. No. 09/597,044, filed Jun. 20, 2000; and Docket No. 1999-0341B (STG207) by L. Hong. et al., entitled "Polling Methods for Use in a Wireless Communication System," U.S. Ser. No. 09/597,016, filed Jun. 20, 2000.

BACKGROUND

1. Field of the Invention

The invention relates generally to wireless networks. In particular, the invention relates to establishing a communication channel in a wireless network.

2. Background of the Invention

Wireless local loop technology is becoming an increasingly popular technology for providing communication service such as telephony, data services and television programming. A fixed wireless loop network includes a plurality of base stations. Each base station is in wireless communication with a plurality of remote units which are typically located at the premises of an end user where they are connected to the premises equipment such as telephones, computers and faxes. The premises equipment receives communication services over a wireless link between the base station and the remote unit.

During a call on a fixed wireless loop network, the base station and remote unit set up the call on one or more control channels. The actual call takes place on one of several communication channels. Because multiple communication channels are available for execution of the call, the communication channel on which a call is actually executed must be selected before the call is executed. Any call control data which needs to be exchanged between the base station and the remote unit after execution of the call begins can be transmitted on the established communication channel.

A variety of external factors can affect the quality of the communication that can be achieved over each of the communication channels. These factors can have a different effect on different communication channels and can change with time. Accordingly, the best channels for execution of a call can change with time. Hence, there is a need for a method of selecting a communication channel which accounts for the quality of connection that can be achieved over the communication channels.

SUMMARY OF THE INVENTION

The invention relates to a method of operating a communication system. The method includes transmitting remote unit channel data from a remote unit to a base station. The remote unit channel data is generated at the remote unit and includes data about a first portion of communication channels on which the call can be executed. The method also includes applying a channel selection method to the transmitted remote unit channel data so as to select a communication channel from among the first portion of communication channels. The method further includes executing a call on the selected communication channel.

The invention also relates to a method of managing a call at a base station. The method includes receiving remote unit channel data from a remote unit and applying a channel selection method to the remote unit channel data so as to select a communication channel from among a first portion of communication channels. The method also includes executing the call on the selected communication channel.

In some instances, applying the channel selection method does not result in selection of a communication channel. In response, the method can also include transmitting to the remote unit a request for another version of the remote unit channel data and receiving the other version of the remote unit channel data from the remote unit. The other version of the remote unit channel data includes data for a different portion of communication channels than the first portion of communication channels.

The invention also relates to a method of managing a call at a remote unit. The method includes transmitting remote unit channel data to a base station and receiving from the base station a communication channel identifier. The communication channel identifier is associated with a communication channel selected from among a first portion of communication channels. The method also includes executing the call on the communication channel associated with the communication channel identifier.

In one embodiment of the method, applying the channel selection method to the remote unit channel data includes applying the channel selection method to base station channel data. The base station channel data is data generated at the base station and including data about a second portion of the communication channels.

The remote unit channel data can be data about the status of the first portion of communication channels. In some instances, the remote unit channel data includes data about the strength of signals transmitted on the first portion of communication channels. In some instances, the remote unit channel data includes a preferred channel data which lists the communication channels on which the remote unit would prefer to execute the call.

The base station channel data can be data about the status of the second portion of communication channels. In some instances, the base station channel data includes data about the strength of signals transmitted on the second portion of communication channels.

DETAILED DESCRIPTION OF THE PREFERRED EMBODIMENT

Figure 1:
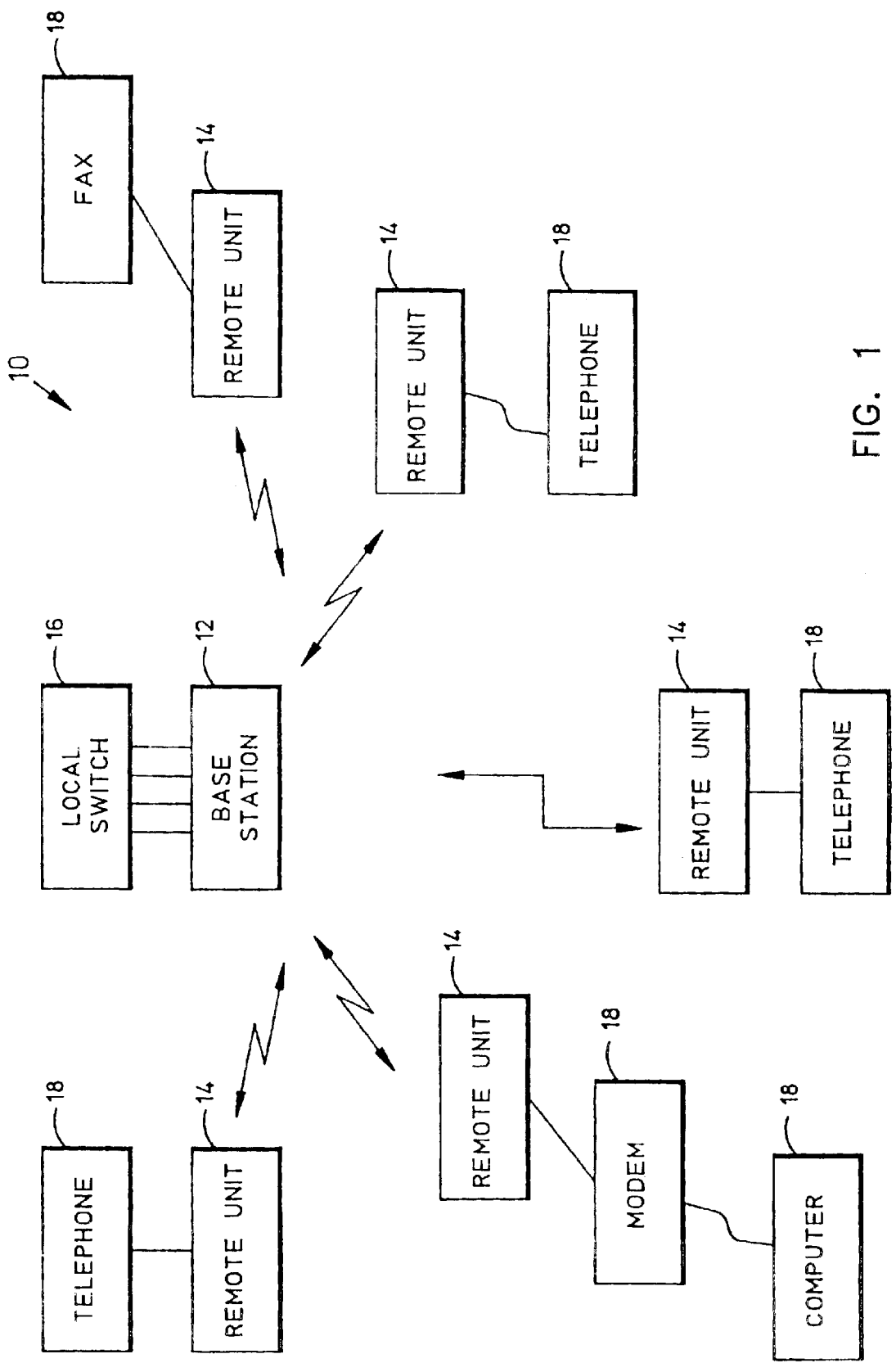
FIG. 1 illustrates a communication system including a base station in wireless communication with a plurality of remote units.

The invention relates to operation of a communication system including a base station in wireless communication with a plurality of remote units. Calls between a remote unit and a base station are executed on a communication channel selected from a plurality of possible communication channels. The remote unit and base station communicate data for controlling and/or setting up the calls on one or more control channels.

The remote units maintain remote unit channel data. The remote unit channel data can include data about the status of the communication channels at the remote unit. For instance, the base station can continuously or intermittently transmit pilot signals on each of the communication channels. The remote unit can measure the strength of the pilot signals at the remote unit and include the measured strengths in the remote unit channel data. The measured pilot signal strength provides an indication of the quality of connection that can be achieved on a particular communication channel. Specifically, a communication channel with a strong pilot signal strength is more likely to provide a good connection between the remote unit and the base station than a communication channel with a weak pilot signal strength.

In some instances, the remote unit channel data includes only preferred channel data. The preferred communication data includes the remote unit channel data for only the communication channels on which the remote unit would prefer to execute a call.

The base station maintains base station channel data. The base station channel data can include data about the status of the communication channels. For instance, the base station can measure the strength of the pilot signals at the base station and include the measured strengths in the base station channel data. Because the base station transmits the pilot signals, these pilot signal strength measurements indicate the degree of interference with the pilot signals from external sources such as neighboring base station.

During operation of the system the remote unit transmits the remote unit channel data to the base station over a control channel. The base station applies a channel selection method to the remote unit channel data and the base station channel data so as to select a communication channel for execution of a call. The base station transmits an identifier associated with the selected communication channel to the remote unit over a control channel. In response, the remote unit contacts the base station over the selected communication channel. The call is then executed on the selected communication channel.

The base station applies the channel selection method to both the remote unit channel data and the base station channel data. As a result, the base station has access to data about the communication channels at both the base station and at the remote unit. A communication channel may not have the same status at both the remote unit and the base station. As a result, selection of a communication channel based on data at only the remote unit or at only the base station can result in selection of a communication channel which is not suitable for carrying the call. Because the channel selection method considers data at both the remote unit and the base station when selecting a communication channel, the channel selection method can increase the opportunity for selecting the best communication channel for execution of a call.

FIG. 1 illustrates an example of a communication system employing one or more base stations 12 and a plurality of remote units 14. The particular system illustrated is a fixed wireless loop network although the invention can be used in conjunction with other systems. A base station 12 is in communication with a local switch 16 which can include, for example, a No. 5 ESS switch provided by Lucent Technologies. A suitable local switch 16 includes, but is not limited to, a voice switch and a data switch. The base station 12 is also in wireless communication with a plurality of remote units 14 located within the service area of the base station 12.

The base station 12 includes a transmitter and a receiver which act as an air link interface to the remote units 14. The base station 12 also includes certain processing and memory capabilities which provide the remote units 14 with the functionality described in this application.

When the system is a fixed wireless loop network, the remote units 14 can be geographically fixed. For instance, the remote units 14 can be fixed to a premises such as a home or a business. The remote unit 14 can be in communication with a variety of premises communication equipment 18 including, but not limited to, telephones, computers, modems and fax machines, wireless phones digital assistants and/or PC assistants.

The remote units 14 also include a transmitter and a receiver which act as an air link interface. The remote units 14 also include processing and memory capabilities which provide the remote units 14 with the functionality described in this application.

Figure 2:
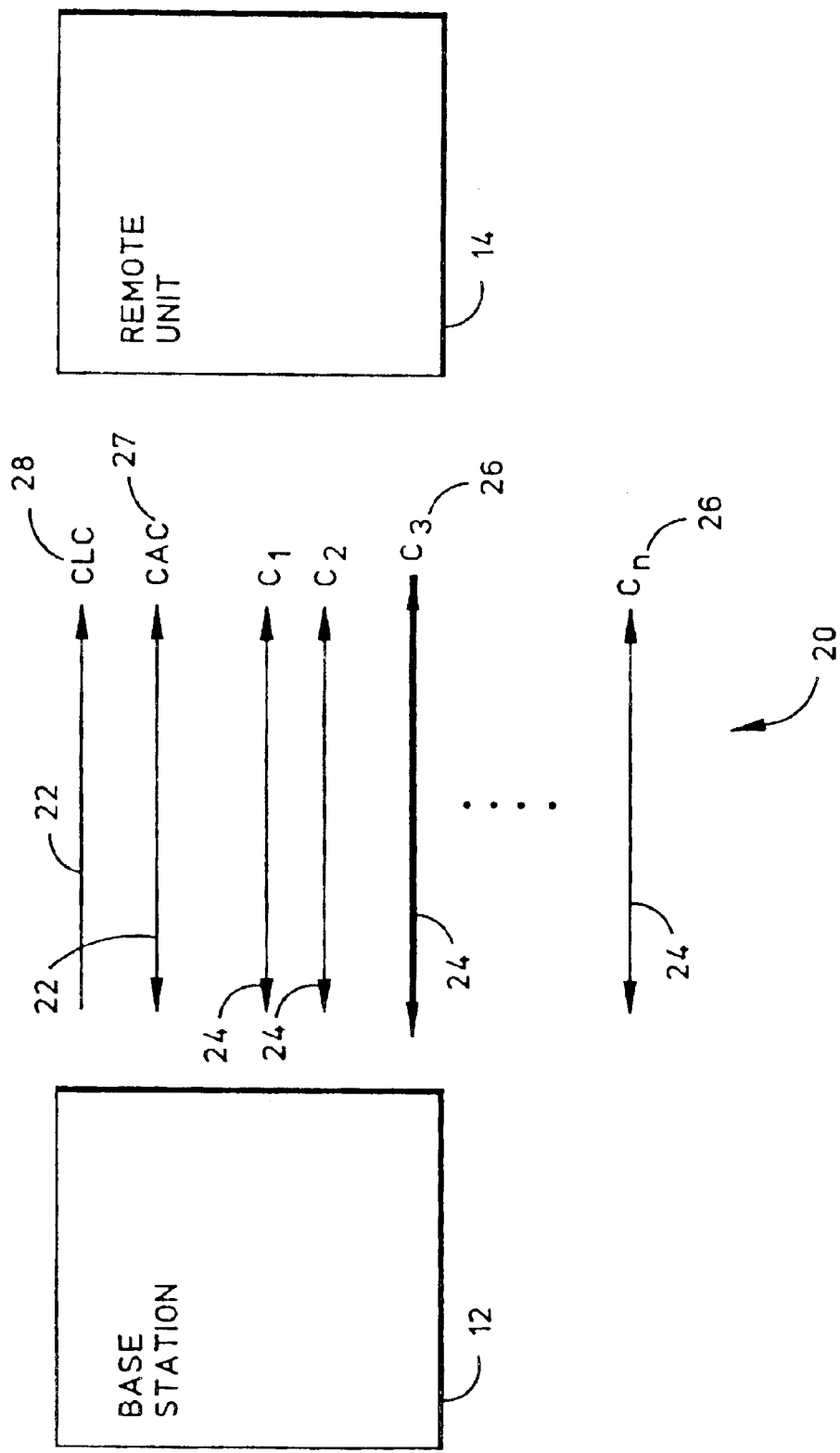
FIG. 2 illustrates communication between a base station and a remote unit.

FIG. 2 illustrates communication between a base station 12 and a remote unit 14. The base station 12 and remote unit 14 communicate over a plurality of channels 20 such as frequency domain channels. One or more of the channels is a control channel 22 and one or more of the channels is a communication channel 24. The communication channels 24 are the channels which carry the call. Each of the communication channels 24 is associated with a unique identifier 26. For the purposes of illustration, the symbols $C_i$–$C_n$ are used as the channel identifiers for the communication channels 24 illustrated in FIG. 2. The communication channel which is used for a particular call is called the communication link. For instance, the communication channel with the channel identifier $C_3$ in FIG. 2 is the communication channel assigned to serve as the communication link for the call. Any of the other communication channels 24 can be assigned to serve as the communication link for subsequent calls between the remote unit 14 and the base station 12.

A control channel 22 is a channel that the remote unit 14 and base station 12 use to communicate data about the call during the set-up of a call. FIG. 2 illustrates two control channels 22. One of the control channels 22 is a Common Access Control (CAC) channel 27 on which the remote unit 14 communicates to the base station 12 and the other is a Common Link Control Channel (CLC) channel 28 on which the base station 12 communicates to the remote unit 14.

The base station 12 selects the communication channel to serve as the communication link by applying a channel selection method to remote unit 14 channel data (RU channel data) received from the remote unit 14 and to base station 12 channel data (BS channel data). The RU channel data can include data that the remote unit 14 generates about the status of the communications channels. For instance the RU channel data can include data indicating the status of the communication channels 24. Data indicating the status of a communication channel can include the strength of pilot signals transmitted on the communication channels 24 as well as other data indicating the current or recent conditions of the communication channels 24.

The RU channel data can also include historical data about the communication channels 24. For instance, the RU channel data can include data for the frequency that each communication channel 24 uses to execute calls which are serviced by the remote unit 14, a time average of the pilot signal strengths for each communication channel, the frequency at which each communication channel falls below a threshold, the frequency with which a hand off is required when each communication channel serves as the communication link. Although the above descriptions specify that the data is available for each of the communication channels 24, in some instances the data may be available for a selection of the communication channels 24.

The remote unit 14 develops the RU channel data by determining the status of the communication channels 24. A portion of the RU communication channel data can be for data measured at the remote unit 14. For instance, when the RU channel data includes data about the strength of pilot signals on the communication channels 24, these signal strengths are measured by the remote unit 14. Accordingly, signal strengths in the RU channel data indicates the strength of the pilot signals at the remote unit 14.

The RU channel data which is transmitted to the base station 12 can be data for a first portion of the communication channels 24. The first portion of the communication channels 24 can include all or a fraction of the communication channels 24. In some instances, the first portion of the communication channels 24 includes only preferred channels. The preferred channel data consists of the communication channel data for the communication channels 24 on which the remote unit 14 would prefer to execute a call. For instance, the preferred channel data can be the RU channel data for the eight communication channels 24 having the strongest signal strengths at the remote unit 14.

Figure 3:
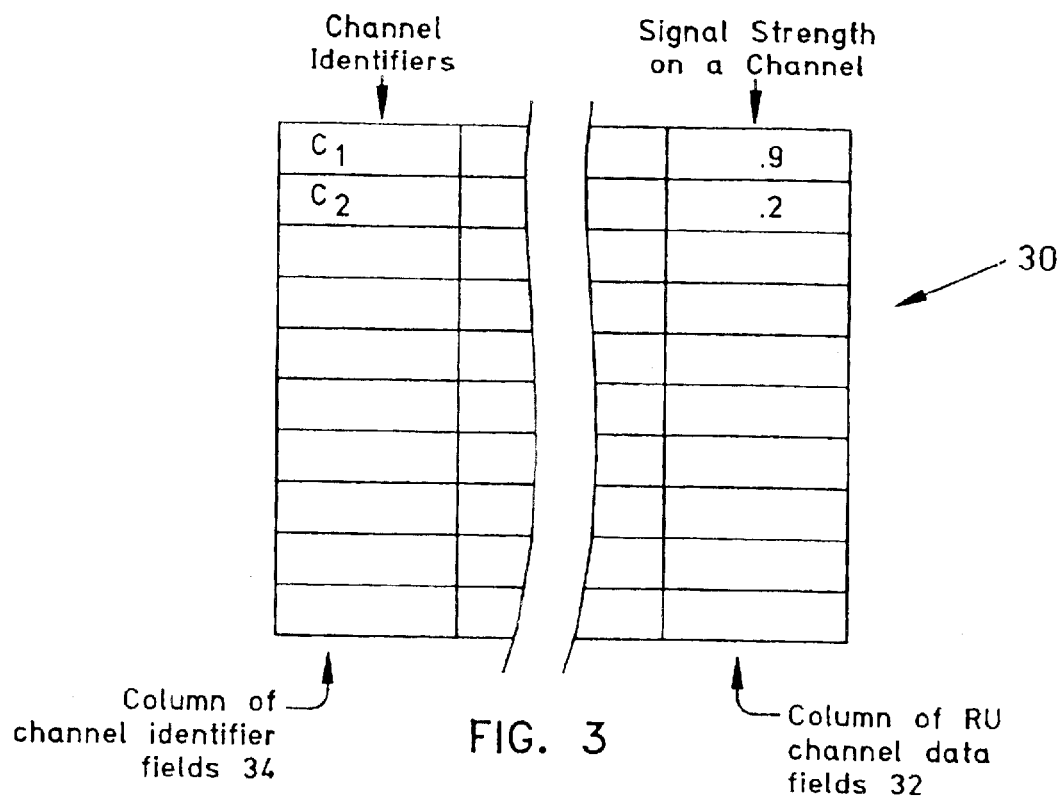
FIG. 3 illustrates a remote unit channel data structure.

The RU channel data can include an RU channel data structure 30 such as the RU channel data structure 30 illustrated in FIG. 3. The RU channel data structure 30 includes one or more columns of RU channel data fields 32 and a column of channel identifier fields 34. The RU channel data fields 32 and channel identifier fields 34 in a row of the RU channel data structure 30 each contain data for a particular communication channel. As a result, the RU channel data fields 32 and the channel identifier field 34 in a row are each associated with a particular communication channel.

Each channel identifier field lists a channel identifier for one of the communication channels 24. Each RU channel data field lists data about the communication channel associated with the particular RU channel data field. As described above, examples of the channel data include the status and or the history of the communication channel. Each column of RU channel data fields 32 is associated with particular data. For instance, one column can be associated with strength of pilot signals transmitted on the communication channels 24 and another can be associated with the frequency that the channels are assigned to be the communication link. A preferred embodiment of the RU channel data structure 30 includes a column of channel identifier fields 34 and a single column of RU channel data fields 32 listing pilot signal strength data. This embodiment of the RU channel data structure 30 can be transmitted to the base station 12 over a control channel 22, such as a CAC channel 27, with low bandwidth requirements.

The status of the communication channels 24 changes with time due to interference from sources outside the system. As a result, the remote units 14 periodically update the channel data structure 30. The remote unit 14 updates the RU channel data structure 30 before, after and during service of calls by the remote unit 14.

Preferred channel data can be stored in a data structure similar to the RU channel data structure 30. For instance, the RU channel data structure 30 can be adapted to include only RU channel data for the eight communication channels 24 having the highest pilot signal strength. These communication channels 24 can be ordered from highest pilot signal strength to lowest pilot signal strength. A preferred embodiment of a preferred channel data structure 30 includes a column of eight channel identifier fields 34 and eight RU channel data fields 32 listing pilot signal strength. The reduced amount of data reduces the bandwidth requirements so the preferred channel data can be easily transmitted to the base station 12 over a control channel 22 such as a CAC channel.

The BS channel data includes data that the base station 12 generates about the status of the communication channels 24. Data indicating the status of a communication channel can include the strength of the pilot signals transmitted on the communication channels 24 and availability of each communication channel. The base station 12 monitors which communication channels 24 have been assigned to serve as the communication link for a call. The communication channels 24 serving as communication links are designated as unavailable. When a call is terminated, the communication channel which served as the communication link for that call is again designated as available. Other criteria can be used to designate a communication channel as available and/or unavailable. For instance, a communication channel can be designated as unavailable if the strength of a pilot signal on that communication channel falls below a certain threshold and/or if the strength of a pilot signal on that communication channel is not available for mechanical reasons.

The BS channel data can also include historical data about the communication channels 24. For instance, the BS channel data can include data for the frequency at which each communication channel 24 is used to execute calls which are serviced by the remote unit 14, a time average of the strength of pilot signals on each communication channel 24, the frequency that each communication channel falls below one or more thresholds, the frequency that a hand off is required each time a communication channel serves as the communication link. Although the above descriptions specify that the data is available for each of the communication channels 24, in some instances the data may only be available for a selection of the communication channels 24.

The base station 12 can measure the status of the communication channels 24 to develop the BS channel data. As a result, a portion of the BS channel data is measured at the base station 12. For instance, when the BS channel data includes data about the strength of pilot signals on the communication channels 24, these signal strengths are measured by the base station 12. Accordingly, pilot signal strengths in the BS channel data indicates the strength of the pilot signal at the base station 12.

The BS channel data can be data for a second portion of the communication channels 24. The second portion of the communication channels 24 can include all or a fraction of the communication channels 24. The second portion of communication can be the same as the first portion of communication channels 24 transmitted from the remote unit 14 or can be different.

Figure 4:
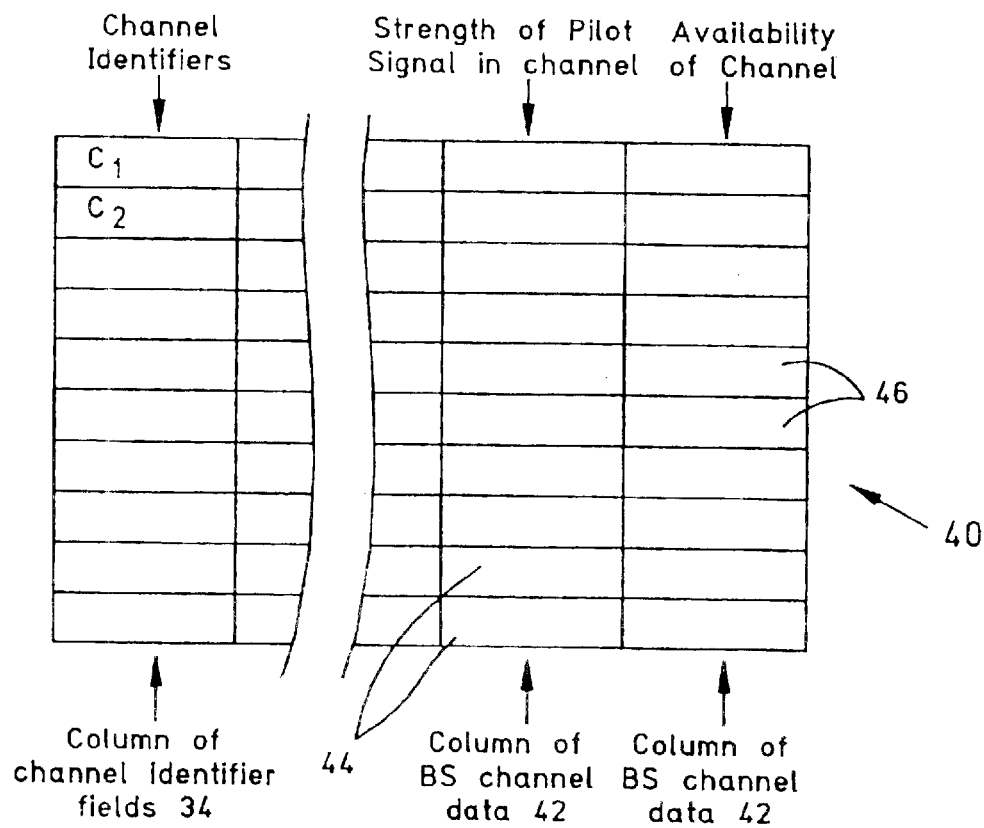
FIG. 4 illustrates a base station channel data structure.

The BS channel data can include a BS channel data structure 40 such as the BS channel data structure 40 illustrated in FIG. 4. The BS channel data structure 40 includes a column of channel identifier fields 34 and two or more columns of BS channel data fields 42 such as pilot signal strength fields 44 and channel availability fields 46. The BS channel data fields 42 and channel identifier fields 34 in a row of the BS channel data structure 40 each contain data for a particular communication channel. As a result, the channel availability field and BS channel data fields 42 in a row are each associated with a particular communication channel.

Each BS channel data field lists data about the associated communication channel. As described above, examples of the channel data include the status and/or the history of the communication channel. Each column of BS channel data fields 42 lists particular data. For instance, the BS channel data fields 42 in one column can list the strengths of pilot signals transmitted on the channels and the BS channel data fields 42 in another column can list whether the communication channels 24 are still available for use by a remote unit 14. A preferred embodiment of the BS channel data structure 40 includes a column of channel identifier fields 34, a column of BS channel data fields 42 listing the strength of pilot signals on the communication channels 24 and a column of BS channel data fields 42 listing the channel availability data.

The status of the communication channels 24 changes with time due to interference from sources outside the system. As a result, the base station 12 periodically updates the BS channel data fields 42. The base station 12 updates the BS channel data fields 42 before, after and during calls serviced by the base station 12.

When a call is incoming to the base station 12 from the remote unit 14, the remote unit 14 sends a call request to the base station 12 over a control channel 22 such as a CAC channel 27. The remote unit 14 also transmits at least a portion of the RU channel data to the base station 12 over a control channel 22 such as a CAC channel 27. When the call is incoming to the remote unit 14 from the base station 12, the base station 12 sends to the target remote unit 14 a call request over a control channel 22 such as a CLC channel 28. In response, the remote unit 14 transmits at least a portion of the RU channel data to the base station 12 over a control channel 22 such as a CAC channel 27. As a result, at least a portion of the RU channel data is transmitted to the base station 12 whether the call is incoming from the base station 12 or the remote unit 14. The RU channel data which is transmitted can be a portion of the RU channel data generated by the remote unit 14. For instance, the remote unit 14 can transmit only the preferred channel list to the base station 12.

After receiving the RU channel data, the base station 12 applies a channel selection method to the RU channel data to select one of the communication channels 24 to serve as the communication link. In some instances, applying a channel selection method to the RU channel data includes applying the channel selection method to the BS channel data. The base station 12 then assigns the selected communication channel to the remote unit 14 by transmitting the channel identifier for the selected communication channel to the remote unit 14 over a control channel 22 such as the CLC channel 28. In response, the remote unit 14 contacts the base station 12 over the assigned communication channel. The base station 12 and remote unit 14 synchronize themselves and the call is then executed on the assigned communication channel, i.e., the communication link.

During the execution of the call, the remote unit 14 and base station 12 can monitor the status of the communication link to determine if the communication link develops an undesirable status during the execution of the call. For instance, the base station 12 or the remote unit 14 can apply one or more call execution criteria to the communication link to determine whether the communication link has developed an undesirable status. Sample call execution criteria include, but are not limited to, whether the strength of the carrier signal on the communication link has fallen below a threshold. Variations of this call execution criteria can also be used. For instance, whether the strength of a carrier signal on the communication link has fallen below a threshold for a particular time span or whether a time average of the carrier signal strength has fallen below a threshold. The call execution criteria can also be a function of the status of the other communication channels 24. For instance, the other communication channels 24 can be monitored to determine whether another communication channel would be a more suitable communication link than the current communication link.

If the remote unit 14 detects that the communication link develops an undesirable status during the execution of the call, the remote unit 14 sends a hand off request to the base station 12. The hand off request can be sent over the communication link or over a control channel. The remote unit 14 also transmits a portion of the RU channel data to the base station 12 over one of the control channels 22. If the base station 12 detects that the communication link has developed an undesirable status, the base station 12 sends the remote unit 14 a hand off request. The hand off request can be sent over the communication link or over a control channel. In response, the remote unit 14 transmits at least a portion of the RU channel data to the base station 12 over a control channel 22 such as a CAC channel 27. As a result, the base station 12 receives the portion of the RU channel data whether the remote unit 14 or the base station 12 detects that the communication link has developed an undesirable status.

Once the base station 12 receives the RU channel data, the base station 12 applies a channel selection method to the RU channel data to select one of the communication channels 24 to serve as the communication link. In some instances, applying a channel selection method to the RU channel data also includes applying the channel selection method to the BS channel data. The base station 12 then assigns the selected communication channel to the remote unit 14 by transmitting the channel identifier for the selected communication channel to the remote unit 14 over a control channel 22 such as a CLC channel 28. In response, the remote unit 14 contacts the base station 12 over the assigned communication channel. The remote unit 14 then contacts the base station 12 over the assigned communication channel and the remainder of the call is executed on the newly assigned channel.

As described above, the base station 12 applies a channel selection method to the RU channel data received from the remote unit 14 and the BS channel data generated by the base station 12. In some instances, the channel selection method is applied only to the preferred channel data received from the remote unit 14 and the BS channel data generated by the base station 12. In these instances, less data needs to be transmitted from the remote unit 14 to the base station 12 over the control channel 22. As a result, this embodiment can reduce the bandwidth needed by a control channel 22.

An example of a channel selection method is identifying the communication channel listed on the preferred channel data which the BS channel data indicates has the highest pilot signal strength at the base station 12. The identified communication channel will then be selected if the channel data also indicates that the communication channel is currently available and has a pilot signal strength above a particular threshold. The communication channel selected using this method will be available for use by the remote unit 14. Additionally, the selected communication channel will likely have an acceptable pilot signal strength because it needed to have a high pilot signal strength at the remote unit 14 in order to be listed on the preferred channel data and because it was also the communication channel on the preferred channel data with the highest pilot signal strength at the base station 12. Hence, the signal should be reliable at both the remote unit 14 and the base station 12.

The channel selection method can also include consideration of the RU channel data at the remote unit 14. For instance, the method can consider both the strength of the pilot signals on the communication channels 24 at the remote unit 14 and the strength of the pilot signals on the communication channels 24 at the base station 12.

Other channel data can be used to make communication channel selections and assignments. For instance, communication channels 24 with a low frequency of falling below a particular threshold may be given a higher weight. Additionally, communication channels 24 which more frequently service calls for the remote unit 14 may be given a higher weight. Further, communication channels 24 which most frequently serve the remote unit 14 without needing to be handed off can be given a higher weight. The higher the weighting of a particular communication channel, the more likely that communication channel is to be selected.

In some instances, the base station 12 may not be able to assign a communication channel. For instance, each of the communication channels 24 on the preferred channel data received from the remote unit 14 might be unavailable. Alternatively, the available communication channels 24 may have a pilot signal strength at the base station 12 which falls below a particular threshold. When the base station 12 is unable to assign a communication channel, the base station 12 can request more preferred channel data from the remote unit 14. As described above, the preferred channel data can include the eight communication channels 24 having the highest pilot signal strength at the remote unit 14. Accordingly, the next preferred channel data transmitted by the remote unit 14 can be a list of the communication channels 24 having the next eight highest pilot signal strengths.

Figure 5:
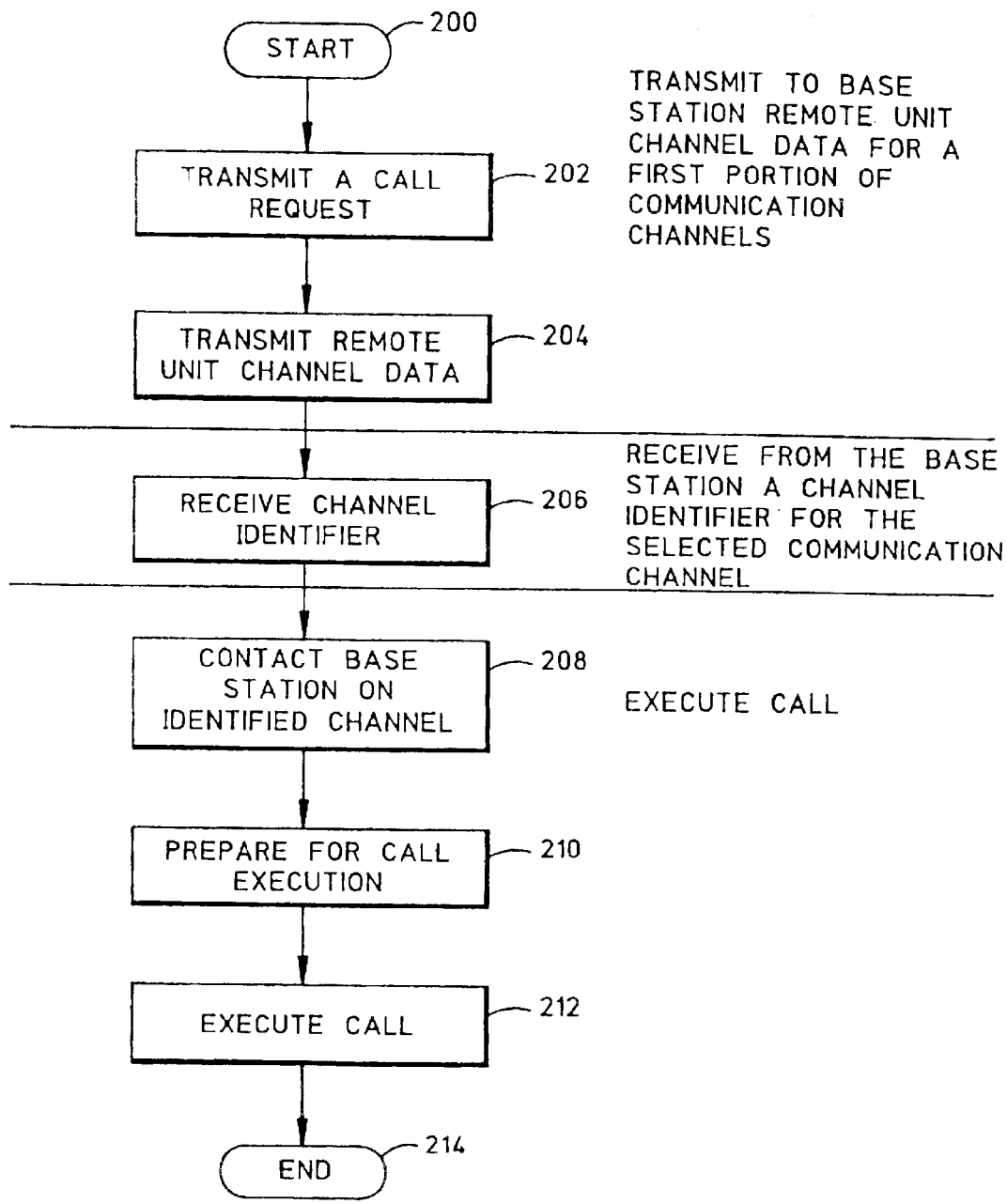
FIG. 5 illustrates a method of operating a remote unit.

FIG. 5 illustrates a method of operating a remote unit 14 according to the present invention. Before, after and during execution of the method, the RU channel data structure 30 is maintained and updated. The RU data channel data structure 30 can be updated by scanning the communication channels 24 to determine the status of each channel and entering the status in the appropriate fields of the RU channel data structure 30. Other channel data fields can also be updated at this time. For instance, fields which list the frequency that a channel falls above or below certain thresholds can be updated. The RU channel data structure 30 can be updated at regular intervals. Alternatively, the update frequency can be a function of whether a call is being serviced by the remote unit 14. Additionally, the update frequency can be a function of the remote units 14 call load. For instance, remote units 14 which are used more often can update the RU channel data structure 30 more frequently. The preferred channel data can be updated after the RU channel data structure 30 is updated or can be updated before being transmitted to the base station 12.

The method of operating the remote unit 14 begins at start block 200 when a call is placed which is to be serviced by the remote unit 14. At process block 202, the remote unit 14 transmits a call request to the base station 12 over a control channel 22. At process block 204, the remote unit 14 transmits RU channel data for a first portion of communication channels 24 to the base station 12 over a control channel 22. In one embodiment, the transmitted RU channel data is the preferred channel data.

The base station 12 applies a channel selection method to the RU channel data and to BS channel data to select a communication channel to serve as the communication link. As described above, application of the channel selection method might not result in selection of a communication channel in some instances. Accordingly, the remote unit 14 may receive one or more requests for additional versions of the RU channel data. In response to each request, the remote unit 14 will transmit to the base station 12 additional versions of the RU channel data over a control channel 22. The other version of the RU channel data may be for a different selection of communication channels 24 than the first portion of communication channels 24.

Figure 7:
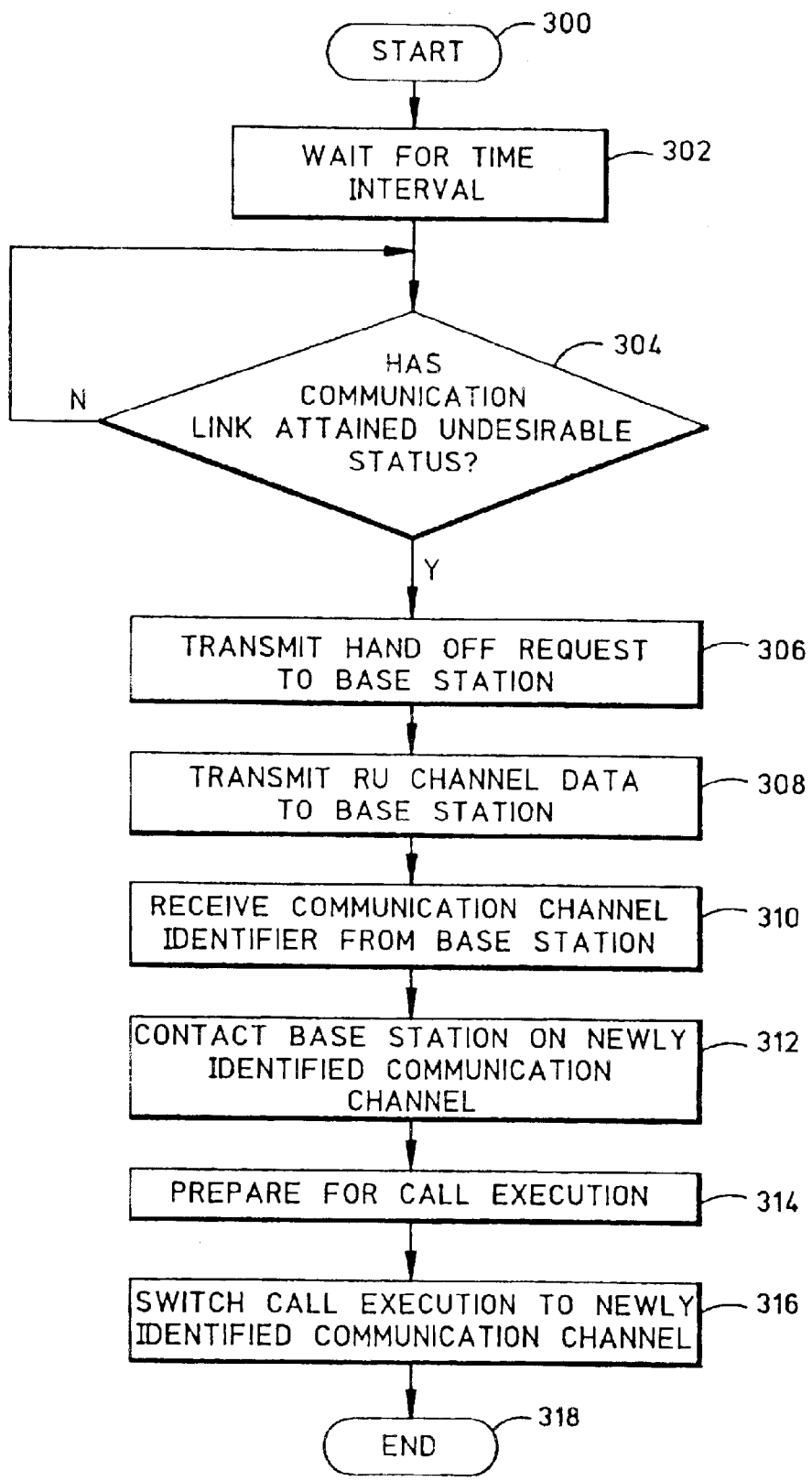
FIG. 7 illustrates a method for executing a hand off check for a remote unit.

At process block 206, the remote unit 14 receives from the base station 12 the channel identifier for the communication channel which is assigned to serve as the communication link for the remote unit 14. At process block 208, the remote unit 14 contacts the base station 12 over the assigned communication link. At process block 210, the remote unit 14 and base station 12 prepare for execution of the call on the assigned communication channel. These preparation can include known steps such as synchronization. At process block 212, the remote unit 14 executes the call on the assigned communication channel. During the execution of the call, the remote unit executes a communication hand off check to determine whether the communication channel on which the call is being executed has developed an undesirable status and a handoff is needed. FIG. 7 illustrates an example of a method of executing the communication hand off check. The method terminates at end block 214 when the call is terminated.

Figure 6:
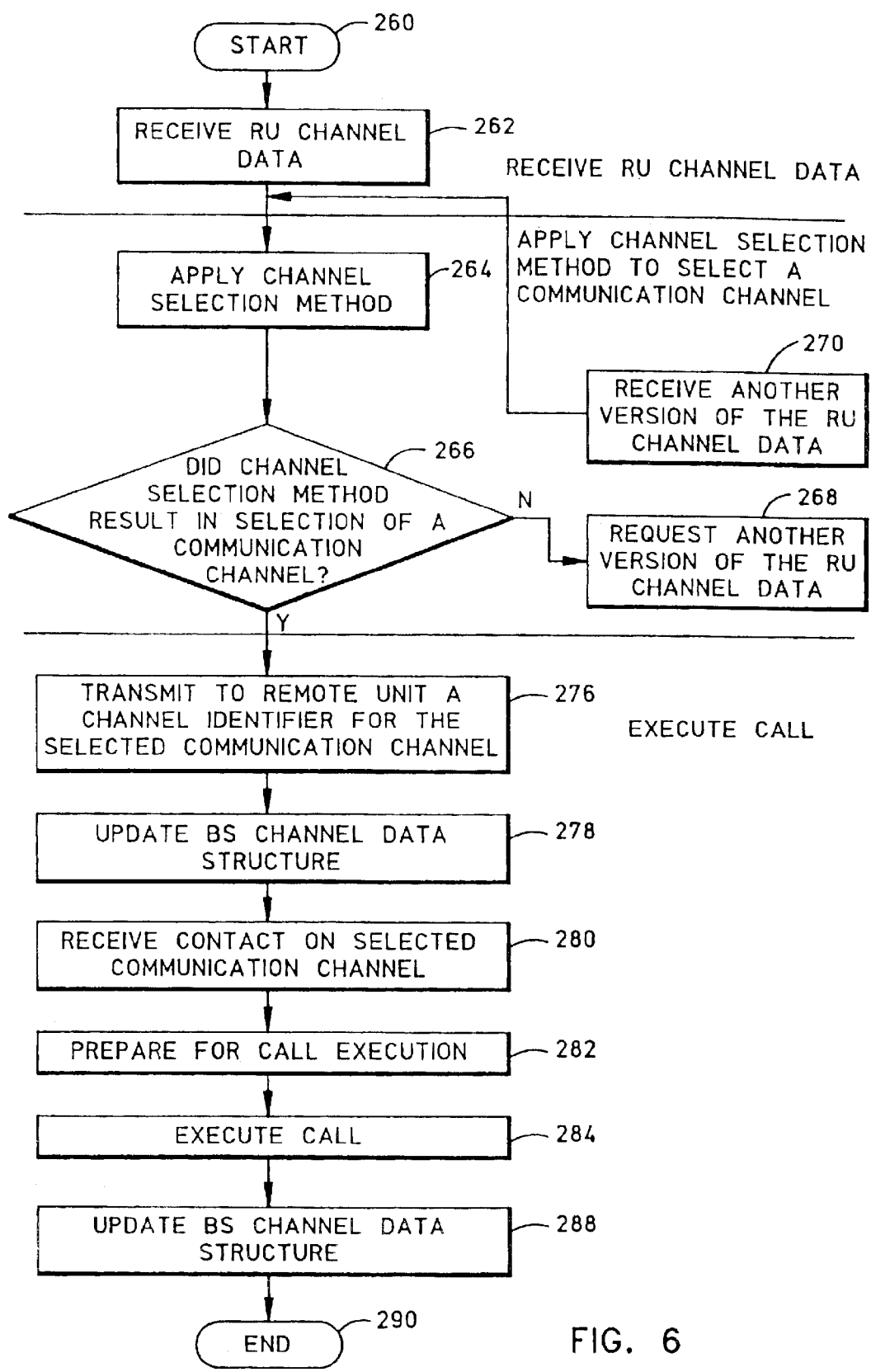
FIG. 6 illustrates a method of operating a base station.

FIG. 6 illustrates a method of operating a base station 12 unit according to the present invention. Before, after and during execution of the method, the base station 12 maintains and updates the RU channel data structure 30. The RU data channel data structure 30 can be updated by scanning the communication channels 24 to determine the status of each channel and entering the status in the appropriate fields of the BS channel data structure 40. For instance, the base station 12 can scan the communication channels 24 to determine the strength of the pilot signals transmitted on each communication channel. The determined pilot signal strength can be entered in the appropriate BS channel data field. Other channel data fields can also be updated in response to scanning the communication channels 24. For instance, fields which list the frequency that a channel falls above or below certain thresholds can be updated.

The BS channel data structure 40 can be updated at regular intervals. Alternatively, the update frequency can be a function of whether a call is being serviced by the remote unit 14. Additionally, the update frequency can be a function of the base station's call load. For instance, base stations 12 experiencing a higher call load can update the BS channel data structure 40 more frequently.

The method of operating the base station 12 begins at start block 260. At process block 262, the remote unit 14 receives the call request and RU channel data for a first portion of the communication channels 24 from the remote unit 14. The RU channel data and call request are transmitted from the remote unit 14 over a control channel 22. In one embodiment, the received RU channel data is the preferred channel data.

At process block 264, the base station 12 applies a channel selection method to the preferred channel data and the BS channel data to select a communication channel to serve as the communication link for the call. At determination block 266, the base station 12 determines whether application of the channel selection method resulted in selection of a communication channel. When the determination is negative, the base station 12 transmits to the remote unit 14 a request for another version of the RU channel data at process block 268. At process block 270, the base station 12 receives an other version of the RU channel data transmitted from the remote unit 14 over a control channel 22. The other version of the RU channel data can be for a different portion of communication channels 24 then the first portion. The method then returns to process block 264.

When the determination at determination block 266 is positive, the method proceeds to process block 276. At process block 276, the base station 12 assigns the selected communication channel to serve as the communication link by transmitting to the remote unit 14 the channel identifier for the selected communication channel. The channel identifier is transmitted to the remote unit 14 on a control channel 22.

At process block 278, the base station 12 updates the BS channel data structure 40 by updating the channel availability field which is associated with the assigned communication channel. The channel availability field is updated to show that the channel is now unavailable for use by another remote unit 14.

Figure 8:
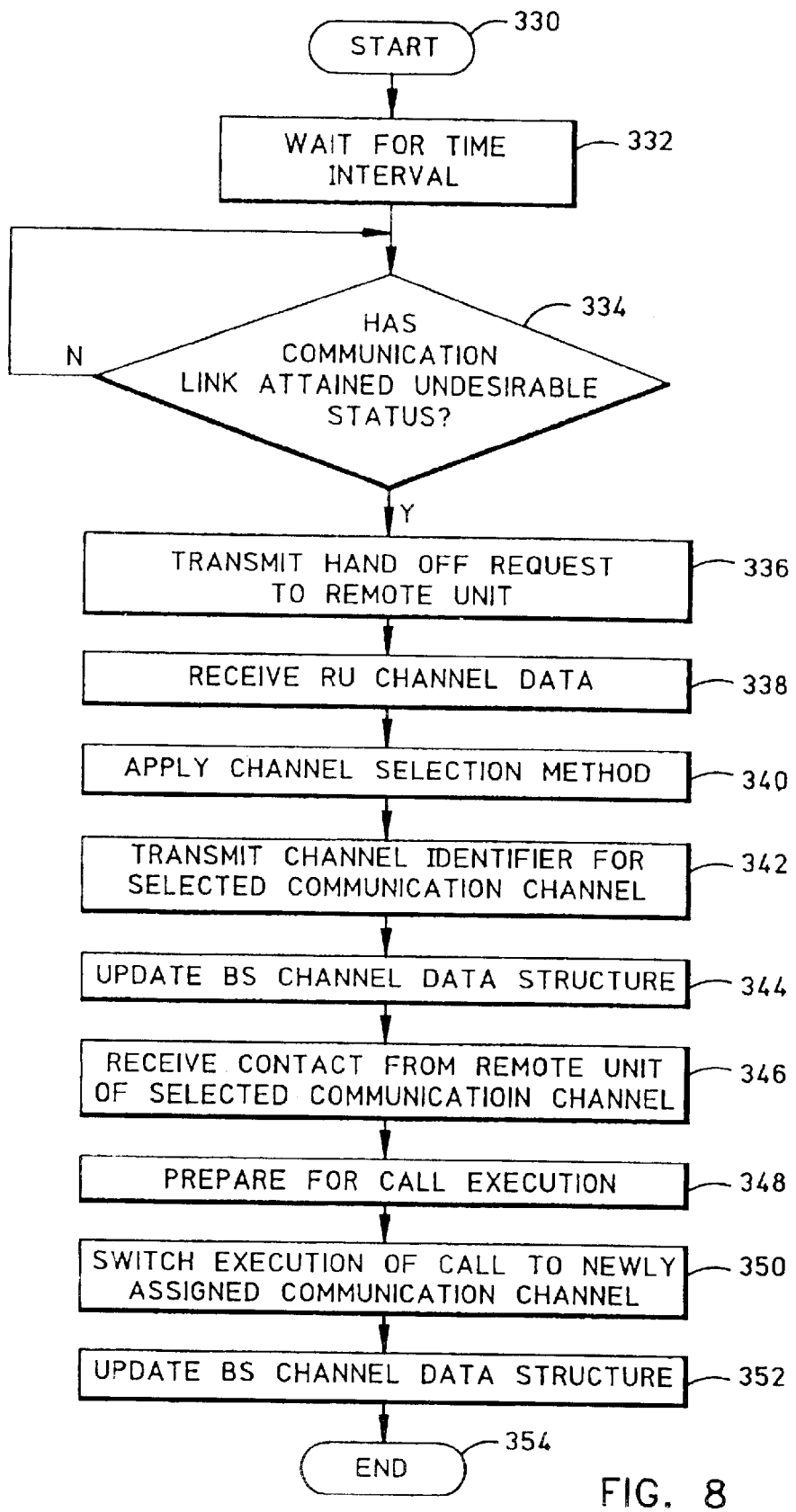
FIG. 8 illustrates a method for executing a hand off check for a base station.

At process block 280 the remote unit 14 contacts the base station 12 on the assigned communication channel. At process block 282, the remote unit 14 and base station 12 prepare for execution of the call on the assigned communication channel. The preparation can include known steps such as synchronization of the remote unit 14 and base station 12. At process block 284, the base station 12 and remote unit 14 execute the call on the assigned communication channel. During the execution of the call, the base station 12 executes a communication hand off check to determine whether the communication channel on which the call is being executed has developed an undesirable status and a handoff is needed. FIG. 8 illustrates a method of executing a hand off check for a base station.

At process block 288, the base station 12 detects the termination of the call. In response to the call termination, the base station 12 updates the BS channel data structure 40 to show that the previously assigned channel is now available for use by another remote station. The method terminates at end block 290.

Although the methods of FIGS. 5 and 6 are directed toward a call originating from the remote unit 14, these methods can be easily adapted for use with calls originating from the base station 12. For instance, when the call is incoming to the remote unit 14 from the base station 12, the base station 12 sends the remote unit 14 a call request over a control channel 22. In response, the remote unit 14 sends to the base station 12 at least a portion of the RU channel data over one of the control channels 22. The methods can then proceed as illustrated.

FIG. 7 illustrates an example of a method of executing a hand off check for a remote unit 14. The method begins at start block 300 after a call is executed on a communication link. At process block 302, the remote unit 14 waits for a time interval. The time interval can be any time greater than or equal to zero seconds depending on the desired frequency of the hand off check.

After the time interval of process block 302 expires, the remote unit 14 proceeds to determination block 304. At determination block 304 a determination is made whether the communication link has developed an undesirable status. As described above, this determination can be made by applying one or more call execution criteria to the communication link. For instance, the determination can be made by determining whether the strength the carrier signal on the communication link has fallen below a threshold. When the determination at determination block 304 is negative, the remote unit 14 returns to process block 302.

When the determination at determination block 304 is positive, the remote unit 14 proceeds to process block 306. At process block 306, the remote unit 14 sends a hand off request to the base station 12. At process block 308, the remote unit 14 transmits RU channel data for a first portion of the communication channels 24 to the base station 12. At process block 310, the remote unit 14 receives a communication channel identifier from the base station 12. The communication channel identifier is the identifier for a newly assigned communication channel to which execution of the call will be switched. The hand off request, the RU channel data and/or the communication channel identifier can be transmitted over the communication link and/or over a control channel 22.

At process block 312, the remote unit 14 contacts the base station 12 over the newly assigned communication channel. At process block 314, the remote unit 14 and base station 12 prepare for execution of the call on the newly assigned communication channel. At process block 316, execution of the call is switched from the originally assigned communication channel to the newly assigned communication channel. The method terminates at end block 318.

FIG. 8 illustrates a method of executing a hand off check for a base station 12. The method begins at start block 330 after a call is executed on a communication link. At process block 332, the base station 12 waits for a time interval. The time interval can be any time greater than or equal to zero seconds depending on the desired frequency of the hand off check.

After the time interval of process block 332 expires, the base station 12 proceeds to determination block 334. At determination block 334 a determination is made whether the communication link has developed an undesirable status. As described above, this determination can be made by applying one or more call execution criteria to the communication link. For instance, the determination can be made by determining whether the strength of a carrier signal on the communication link at the base station 12 has fallen below a threshold. When the determination at determination block 334 is negative, the base station 12 returns to process block 332.

When the determination at determination block 334 is positive, the base station proceeds to process block 336. At process block 336, the base station sends a hand off request to the remote unit 14. In response, the base station 12 receives the RU channel data from the remote unit 14 at process block 338. At process block 340, the base station 12 applies a channel selection method to the preferred channel data and the BS channel data to select a new communication channel to serve as the communication link for the call. At process block 342, the base station 12 assigns the newly selected communication channel to serve as the communication link by transmitting to the remote unit 14 the channel identifier for the selected communication channel. The hand off request, the RU channel data and/or the communication channel identifier can be transmitted over the communication link and/or over a control channel 22.

At process block 344, the base station 12 updates the BS channel data structure 40 by updating the channel availability field which is associated with the newly assigned communication channel. The channel availability field is updated to show that the channel is now unavailable for use by another remote unit 14.

At process block 346, the remote unit 14 contacts the base station 12 on the newly assigned communication channel. At process block 348, the remote unit 14 and base station 12 prepare for execution of the call on the assigned communication channel. The preparation can include known steps such as synchronization of the remote unit 14 and base station 12. At process block 350, execution of the call is switched from the originally assigned communication channel to the newly assigned communication channel.

At process block 352 the base station 12 updates the BS channel data structure 40 to show that the previously assigned channel is now available for use by another remote station. The method terminates a end block 354.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

What is claimed is:

1. A method of operating a communication system, comprising:
    transmitting, via an air link, remote unit channel data from a remote unit to a base station, the remote unit channel data being generated at the remote unit and including data about a first portion of communication channels on which a call can be executed;
    applying a channel selection method to the transmitted remote unit channel data so as to select a communication channel from among the first portion of communication channels;
    transmitting a channel identifier associated with the selected communication channel from the base station to the remote unit before executing the call on the selected communication channel;
    executing the call on the selected communication channel; and
    waiting for the remote unit to contact the base station on the selected communication channel after transmitting the channel identifier.

2. The method of claim 1, wherein the remote unit channel data is transmitted to the base station over a control channel.

3. The method of claim 1, wherein the remote unit channel data includes data about the status of the first portion of the communication channels.

4. The method of claim 3, wherein the status of the first portion of the communication channels includes the strength of signals transmitted on the first portion of communication channels.

5. The method of claim 3, wherein the remote unit channel data includes data about the status of a second portion of the communication channels.

6. The method of claim 5, wherein the status of the first portion of the communication channels includes the strength of signals transmitted on the first portion of communication channels and the status of the second portion of the communication channels includes the strength of signals transmitted on the second portion of communication channels.

7. The method of claim 1, wherein the remote unit channel data includes preferred channel data.

8. The method of claim 1, wherein the channel identifier is transmitted over a control channel.

9. The method of claim 1, further comprising:
    transmitting a request for a second version of the remote unit channel data from the base station to the remote unit in response to execution of the channel selection method failing to result in selection of a communication channel; and
    transmitting from the remote unit to the base station the second version of the remote unit channel data from the remote unit.

10. A method of operating a communication system, comprising:
    transmitting, via an air link, remote unit channel data from a remote unit to a base station, the remote unit channel data being generated at the remote unit and including data about a first portion of communication channels on which a call can be executed;
    applying a channel selection method to the transmitted remote unit channel data so as to select a communication channel from among the first portion of communication channels; and
    executing the call on the selected communication channel;
    wherein applying the channel selection method to the remote unit channel data includes applying the channel selection method to base station channel data, the base station channel data being generated at the base station and including data about a second portion of the communication channels.

11. A method of managing a call at a base station of a fixed wireless loop network, comprising:
    receiving from a remote unit, via an air link, remote unit channel data, the remote unit channel data being generated at the remote unit and including data about a first portion of communication channels on which the call can be executed;
    applying a channel selection method to the remote unit channel data so as to select a communication channel from among the first portion of communication channels;
    transmitting a channel identifier associated with the selected communication channel to the remote unit over a control channel before executing the call on the selected communication channel;
    executing the call on the selected communication channel; and
    waiting for the remote unit to contact the base station on the selected communication channel after transmitting the channel identifier.

12. The method of claim 11, wherein the remote unit transmits the remote unit channel data to the base station over a control channel.

13. The method of claim 11, wherein the data about the first portion of the communication channels includes data about the status of the first portion of the communication channels and the remote unit channel data also includes data about the status of the second portion of a communication channels.

14. The method of claim 13, wherein the status of the first portion of the communication channels includes the strength of signals transmitted on the first portion of communication channels and the status of the second portion of the communication channels includes the strength of signals transmitted on the second portion of communication channels.

15. The method of claim 11, wherein the remote unit channel data includes preferred channel data.

16. The method of claim 11, further comprising:

transmitting a request for a second version of the remote unit channel data from the base station to the remote unit in response to execution of the channel selection method failing to result in selection of a communication channel; and transmitting from the remote unit to the base station the second version of the remote unit channel data from the remote unit.

17. The method of claim 16, wherein the second version of the remote unit channel data includes data for a different portion of communication channels than the first portion of communication channels.

18. A method of managing a call at a base station of a fixed wireless loop network, comprising:

receiving from a remote unit, via an air link, remote unit channel data, the remote unit channel data being generated at the remote unit and including data about a first portion of communication channels on which the call can be executed;

applying a channel selection method to the remote unit channel data so as to select a communication channel from among the first portion of communication channels; and executing the call on the selected communication channel, wherein applying the channel selection method to the remote unit channel data includes applying the channel selection method to base station channel data, the base station channel data being generated at the base station and including data about a second portion of the communication channels.

* * * * *